US011753991B2

(12) United States Patent
Feng et al.

(10) Patent No.: US 11,753,991 B2
(45) Date of Patent: Sep. 12, 2023

(54) INTAKE-EXHAUST TRANSPORT APPARATUS MOBILE POWER GENERATION SYSTEM AND ASSEMBLING METHOD THEREOF

(71) Applicant: YANTAI JEREH PETROLEUM EQUIPMENT & TECHNOLOGIES CO., LTD., Shandong (CN)

(72) Inventors: Ning Feng, Shandong (CN); Xin Li, Shandong (CN); Ting Zhang, Shandong (CN); Libin Zhou, Shandong (CN); Lili Wang, Shandong (CN); Wanchun Zha, Shandong (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 114 days.

(21) Appl. No.: 17/461,293

(22) Filed: Aug. 30, 2021

(65) Prior Publication Data

US 2021/0388760 A1    Dec. 16, 2021

Related U.S. Application Data

(63) Continuation-in-part of application No. 16/837,107, filed on Apr. 1, 2020, now Pat. No. 11,125,156.

(30) Foreign Application Priority Data

Jun. 25, 2019    (CN) .......................... 201910552752.1

(51) Int. Cl.
*F02C 6/00*    (2006.01)
*B66F 7/16*    (2006.01)
(Continued)

(52) U.S. Cl.
CPC .................. *F02C 6/00* (2013.01); *B66F 7/16* (2013.01); *H02K 7/1823* (2013.01);
(Continued)

(58) Field of Classification Search
CPC ........... F02C 6/00; B66F 7/16; H02K 7/1823; F05D 2220/32; F05D 2220/76; F05D 2230/60
See application file for complete search history.

(56) References Cited

U.S. PATENT DOCUMENTS 2,937,879 A    5/1960    Lion
3,289,868 A    12/1966    Miller
(Continued)

FOREIGN PATENT DOCUMENTS

CN    107208557 A    9/2017
CN    210289933 U    4/2020

*Primary Examiner* — Pedro J Cuevas
(74) *Attorney, Agent, or Firm* — XSENSUS LLP

(57) ABSTRACT

An intake-exhaust transport apparatus, a mobile power generation system and an assembling method thereof are provided. The assembling method includes: roughly adjusting a position of the intake-exhaust system in a second direction with respect to the power generation apparatus by the second conveyance; jacking up the intake assembly and the exhaust duct as a whole, to be higher than a height of the power generation apparatus by the lifting mechanism; moving the power generation apparatus to a region under the intake-exhaust system by the first conveyance and adjusting a position of the power generation apparatus in the first direction with respect to the intake-exhaust system; and connecting the intake assembly and the exhaust duct to a top of the power generation apparatus.

16 Claims, 4 Drawing Sheets

(51) Int. Cl.
*H02K 7/18* (2006.01)
*E21B 43/26* (2006.01)

(52) U.S. Cl.
CPC ...... *E21B 43/2607* (2020.05); *F05D 2220/32* (2013.01); *F05D 2220/76* (2013.01); *F05D 2230/60* (2013.01)

(56) References Cited

U.S. PATENT DOCUMENTS

| | | |
|---|---|---|
| 3,453,443 A | 7/1969 | Stoeckly |
| 3,541,598 A | 11/1970 | Dousset |
| 3,556,928 A | 1/1971 | Zolg |
| 3,567,271 A | 3/1971 | Gostomski |
| 3,570,695 A | 3/1971 | Schwartz |
| 3,640,502 A | 2/1972 | Bargman, Jr. |
| 3,688,931 A | 9/1972 | Tax et al. |
| 3,744,652 A | 7/1973 | Rieschel |
| 3,791,682 A | 2/1974 | Mitchell |
| 3,881,689 A | 5/1975 | Bury |
| 3,925,679 A | 12/1975 | Berman |
| 3,995,760 A | 12/1976 | Burgdorf |
| 4,117,342 A | 9/1978 | Melley, Jr. |
| 4,136,432 A | 1/1979 | Melley, Jr. |
| 4,171,927 A | 10/1979 | Aoyama |
| 4,491,452 A | 1/1985 | Matovich |
| 4,599,030 A | 7/1986 | Skaalen |
| 4,723,744 A | 2/1988 | Baker, Jr |
| 4,992,699 A | 2/1991 | Parmley |
| 5,417,540 A | 5/1995 | Cox |
| 5,517,822 A | 5/1996 | Haws |
| 5,624,225 A | 4/1997 | Cox |
| 5,800,114 A | 9/1998 | Secondi |
| D456,583 S | 4/2002 | Schmidt |
| 6,388,869 B1 | 5/2002 | Fauteux |
| 6,393,775 B1 | 5/2002 | Staschik |
| 6,449,957 B1 | 9/2002 | Takmatsu |
| 6,450,133 B1 | 9/2002 | Bernard |
| 6,601,542 B2 | 8/2003 | Campion |
| 6,644,247 B2 | 11/2003 | Campion |
| 6,688,048 B2 | 2/2004 | Staschik |
| 6,749,388 B1 | 6/2004 | Schmidt |
| 6,765,304 B2 | 7/2004 | Baten |
| 6,786,051 B2 | 9/2004 | Kristich |
| 6,893,487 B2 | 5/2005 | Alger |
| 6,895,903 B2 | 5/2005 | Campion |
| 7,007,966 B2 | 3/2006 | Campion |
| 7,081,682 B2 | 7/2006 | Campion |
| D526,932 S | 8/2006 | Bock |
| 7,100,896 B1 | 9/2006 | Cox |
| 7,122,913 B2 | 10/2006 | Witten |
| 7,221,061 B2 | 5/2007 | Alger |
| 7,451,883 B2 | 11/2008 | Wierzba |
| 7,466,033 B2 | 12/2008 | Witten |
| 7,546,929 B2 | 6/2009 | Wierzba |
| 7,608,934 B1 | 10/2009 | Hunter |
| 7,619,319 B1 | 11/2009 | Hunter |
| 7,722,110 B2 | 5/2010 | McCarthy |
| 7,731,041 B2 | 6/2010 | Gredel |
| 7,811,044 B2 | 10/2010 | Warhurst |
| 7,866,933 B2 | 1/2011 | Welch |
| 7,913,864 B2 | 3/2011 | Wierzba |
| 7,921,914 B2 | 4/2011 | Bruins |
| 7,976,266 B2 | 7/2011 | Brown |
| 8,037,966 B2 | 10/2011 | Errera |
| 8,182,193 B2 | 5/2012 | Gaudet |
| 8,221,626 B2 | 7/2012 | Sassow |
| 8,294,285 B2 | 10/2012 | Hunter |
| 8,294,286 B2 | 10/2012 | Hunter |
| 8,450,863 B2 | 5/2013 | Farr |
| 8,480,158 B2 | 7/2013 | McCarthy |
| 8,491,009 B2 | 7/2013 | Shelton |
| 8,495,869 B2 | 7/2013 | Beissler |
| 8,587,136 B2 | 11/2013 | Williams |
| 8,678,471 B2 | 3/2014 | Mccarthy |
| 8,678,941 B2 | 3/2014 | Bilsen |
| 8,680,728 B2 | 3/2014 | Errera |
| 8,789,601 B2 | 7/2014 | Broussard |
| 8,857,837 B2 | 10/2014 | Gaudet |
| 9,103,193 B2 | 8/2015 | Coli |
| 9,174,828 B2 | 11/2015 | Stokes |
| 9,302,891 B2 | 4/2016 | Wierzba |
| 9,376,801 B1 | 6/2016 | Warren |
| 9,470,460 B2 | 10/2016 | Stimus |
| 9,534,370 B2 | 1/2017 | Kokoschka |
| 9,534,473 B2 | 1/2017 | Morris |
| 9,562,420 B2 | 2/2017 | Morris |
| 9,590,472 B2 | 3/2017 | Davies |
| 9,791,590 B2 | 10/2017 | Morton |
| 9,938,777 B2 | 4/2018 | Sigmar |
| 10,030,579 B2 | 7/2018 | Austin |
| 10,184,397 B2 | 1/2019 | Austin |
| 10,266,219 B2 | 4/2019 | Van Raden |
| 10,317,566 B2 | 6/2019 | Morton |
| 10,337,402 B2 | 7/2019 | Austin |
| 10,371,012 B2 | 8/2019 | Davis |
| 10,458,334 B2 | 10/2019 | Davis |
| 10,532,899 B2 | 1/2020 | Oh |
| 10,961,914 B1 | 3/2021 | Yeung |
| 10,962,305 B2 | 3/2021 | Morris |
| 11,434,763 B2 * | 9/2022 | Morris .................. H02K 7/116 |
| 2002/0189173 A1 | 12/2002 | Staschik |
| 2003/0030246 A1 | 2/2003 | Campion |
| 2003/0030279 A1 | 2/2003 | Campion |
| 2003/0030281 A1 | 2/2003 | Campion |
| 2003/0033994 A1 | 2/2003 | Campion |
| 2003/0057704 A1 | 3/2003 | Baten |
| 2003/0079479 A1 | 5/2003 | Kristich |
| 2004/0104577 A1 | 6/2004 | Alger |
| 2006/0006652 A1 | 1/2006 | Witten |
| 2006/0080971 A1 | 4/2006 | Smith |
| 2006/0260331 A1 | 11/2006 | Andreychuk |
| 2006/0288902 A1 | 12/2006 | McGuire |
| 2009/0308602 A1 | 12/2009 | Bruines |
| 2009/0322096 A1 | 12/2009 | Errera |
| 2010/0060093 A1 | 3/2010 | Hunter |
| 2011/0057454 A1 | 3/2011 | Kawakita |
| 2012/0255734 A1 | 10/2012 | Coli |
| 2013/0026765 A1 | 1/2013 | Errera |
| 2014/0039708 A1 | 2/2014 | Curtis |
| 2014/0174717 A1 | 6/2014 | Broussard |
| 2015/0027712 A1 | 1/2015 | Vicknair |
| 2015/0068754 A1 | 3/2015 | Coli |
| 2015/0122558 A1 | 5/2015 | Van Raden |
| 2015/0252661 A1 | 9/2015 | Glass |
| 2016/0177675 A1 | 6/2016 | Morris |
| 2016/0177678 A1 | 6/2016 | Morris |
| 2016/0369609 A1 | 12/2016 | Morris |
| 2017/0036716 A1 | 2/2017 | Van Raden |
| 2017/0104389 A1 | 4/2017 | Morris et al. |
| 2017/0133909 A1 | 5/2017 | Morales Ivarez et al. |
| 2018/0080376 A1 | 3/2018 | Austin |
| 2018/0080377 A1 | 3/2018 | Austin |
| 2019/0063262 A1 | 2/2019 | Davis |
| 2019/0063263 A1 | 2/2019 | Davis |
| 2019/0063308 A1 | 2/2019 | Davis |
| 2019/0063309 A1 | 2/2019 | Davis |
| 2019/0063326 A1 | 2/2019 | Davis |
| 2019/0063341 A1 | 2/2019 | Davis |
| 2019/0067991 A1 | 2/2019 | Davis |
| 2019/0390910 A1 | 12/2019 | Dokic |
| 2020/0347725 A1 | 11/2020 | Morris |
| 2020/0408071 A1 | 12/2020 | Li |
| 2020/0408144 A1 | 12/2020 | Feng |
| 2020/0408147 A1 | 12/2020 | Zhang |
| 2020/0408149 A1 | 12/2020 | Li |
| 2021/0071574 A1 | 3/2021 | Feng |
| 2021/0079849 A1 | 3/2021 | Yeung |
| 2021/0102531 A1 | 4/2021 | Bodishbaugh |
| 2022/0255402 A1 * | 8/2022 | Warren .................. H02J 4/00 |
| 2023/0015529 A1 * | 1/2023 | Zhang .................. F02C 6/00 |

* cited by examiner

INTAKE-EXHAUST TRANSPORT APPARATUS MOBILE POWER GENERATION SYSTEM AND ASSEMBLING METHOD THEREOF

This application is a continuation in part of U.S. Ser. No. 16/837,107 filed on Apr. 1, 2020, which claims priority from Chinese patent application No. CN 201910552752.1 filed on Jun. 25, 2019. For all purposes, the disclosures of all of these applications hereby incorporated herein by reference in their entirety.

TECHNICAL FIELD

Embodiments of the present disclosure relate to the field of power generation technologies, and specifically to an intake-exhaust transport apparatus, a mobile power generation system and an assembling method thereof.

BACKGROUND

The oil and gas industry generally adopts hydraulic fracturing to promote the production of hydrocarbon wells (for example, oil or gas wells). Conventional fracturing equipment generally has the problems of occupying a large area, causing severe environmental pollution and so on, failing to satisfy the increasingly serious environmental requirements and the requirements on the area occupied by well-site operations.

A complete set of electrically-driven fracturing equipment will effectively reduce the discharge of environmental pollutants, the occupied area, noise and the operation and maintenance costs. With the use of a complete set of electrically-driven fracturing equipment and the continuous increase of the power of electrically-driven fracturing equipment, higher requirements are imposed on power supply at the operation site. At the well-site, the power supply for fracturing equipment generally cannot be realized by using a power grid. Moreover, the fracturing operation has the characteristic of short operation cycle, and fracturing equipment needs to be moved among different well-sites.

SUMMARY

Embodiments of the present disclosure disclose a mobile power generation system, an assembling method of the mobile power generation system and an intake-exhaust transport apparatus.

At least one embodiment of the present disclosure provides an assembling method of a mobile power generation system includes: moving a power generation apparatus to a first designated position by a first conveyance, the power generation apparatus being located on the first conveyance; moving an intake-exhaust system to a second designated position by a second conveyance, the intake-exhaust system being located on the second conveyance, the first designated position and the second designated position being arranged in a first direction; roughly adjusting a position of the intake-exhaust system in a second direction with respect to the power generation apparatus by the second conveyance, the intake-exhaust system including an intake assembly, an exhaust duct, a lifting mechanism and a horizontal adjusting mechanism, the second direction being perpendicular to the first direction; jacking up the intake assembly and the exhaust duct as a whole, to be higher than a height of the power generation apparatus by the lifting mechanism; moving the power generation apparatus to a region under the intake-exhaust system by the first conveyance and adjusting a position of the power generation apparatus in the first direction with respect to the intake-exhaust system; and connecting the intake assembly and the exhaust duct to a top of the power generation apparatus.

For example, in the assembling method of the mobile power generation system provided by an embodiment of the present disclosure, before connecting the intake assembly and the exhaust duct to the top of the power generation apparatus, the assembling method comprises: adjusting the position of the intake assembly and the exhaust duct in the second direction with respect to the power generation apparatus by the horizontal adjusting mechanism.

For example, in the assembling method of the mobile power generation system provided by an embodiment of the present disclosure, jacking up the intake assembly and the exhaust duct as a whole, to be higher than a height of the power generation apparatus by the lifting mechanism includes: separating the intake assembly and the exhaust duct from the second conveyance; and connecting the intake assembly and the exhaust duct to the top of the power generation apparatus includes: lowering the intake assembly and the exhaust duct as a whole to the top of the power generation apparatus and connecting the intake assembly and the exhaust duct to the top of the power generation apparatus.

For example, in the assembling method of the mobile power generation system provided by an embodiment of the present disclosure, moving the power generation apparatus to a region under the intake-exhaust system by the first conveyance and adjusting a position of the power generation apparatus in the first direction with respect to the intake-exhaust system further includes: moving the second conveyance out of the region under the intake assembly and the exhaust duct which have been jacked up, so as to form a channel under the intake assembly and the exhaust duct to allow the first conveyance to pass through.

For example, in the assembling method of the mobile power generation system provided by an embodiment of the present disclosure, the power generation apparatus includes a gas turbine, a generator, an intake chamber and an exhaust collector.

For example, in the assembling method of the mobile power generation system provided by an embodiment of the present disclosure, the horizontal adjusting mechanism includes a retractable support mechanism for bearing the intake assembly and the exhaust duct, and configured to implement a horizontal movement of the intake assembly and the exhaust duct by its horizontal expansion.

For example, in the assembling method of the mobile power generation system provided by an embodiment of the present disclosure, the retractable support mechanism includes: a supporting frame, connected with the intake assembly and the exhaust duct; an expansion chamber, fixed on the supporting frame; an expansion support; and a horizontal hydraulic cylinder, including a fixed end and a movable end, one end of the expansion support is connected to the lifting mechanism, and the other end of the expansion support is partially disposed in the expansion chamber and movable in the expansion chamber along the second direction, the fixed end of the horizontal hydraulic cylinder is connected with the supporting frame and the movable end of the horizontal hydraulic cylinder is connected with the lifting mechanism and is configured to move along the second direction.

For example, in the assembling method of the mobile power generation system provided by an embodiment of the present disclosure, adjusting the position of the intake assembly and the exhaust duct in the second direction with respect to the power generation apparatus by the horizontal adjusting mechanism includes: stabilizing the intake assembly and the exhaust duct along the second direction with the expansion chamber and the expansion support; and driving the support frame to move along the second direction by the horizontal hydraulic cylinder to adjust the position of the intake assembly and the exhaust duct in the second direction with respect to the power generation apparatus.

For example, in the assembling method of the mobile power generation system provided by an embodiment of the present disclosure, the lifting mechanism includes at least four lifting legs, configured to move outward the second conveyance and jack up the intake-exhaust system to be higher than a height of the power generation transport apparatus, each of the at least four lifting legs includes a vertical hydraulic cylinder, configured to jack up the intake assembly and the exhaust duct by its expansion.

For example, in the assembling method of the mobile power generation system provided by an embodiment of the present disclosure, the retractable support mechanism includes a plurality of expansion groups, arranged along a jacking direction of the lifting mechanism, each of the plurality of expansion groups includes two expansion pairs, each of the two expansion pairs includes one expansion chamber and one expansion support, in each of the plurality of expansion groups, one of the two expansion pairs is connected with one of the at least four lifting legs, and the other one of the two expansion pairs is connected with another of the at least four lifting legs.

For example, in the assembling method of the mobile power generation system provided by an embodiment of the present disclosure, the retractable support mechanism includes two horizontal hydraulic cylinders, one of the two horizontal hydraulic cylinders is connected with one of the at least four lifting legs, and the other one of the two horizontal hydraulic cylinders is connected with another of the at least four lifting legs.

For example, in the assembling method of the mobile power generation system provided by an embodiment of the present disclosure, the fixed end of one of the two horizontal hydraulic cylinders is connected with the fixed end of the other one of the two horizontal hydraulic cylinders.

For example, in the assembling method of the mobile power generation system provided by an embodiment of the present disclosure, the exhaust duct includes an exhaust stack and an exhaust silencer, during transportation, the exhaust stack is sleeved outside the exhaust silencer, the assembling method further includes: lifting the exhaust stack upwards to a top of the exhaust silencer.

At least one embodiment of the present disclosure further provides a mobile power generation system, which includes: a power generation transport apparatus, including a first conveyance and a power generation apparatus disposed on the first conveyance; an intake-exhaust transport apparatus, including a second conveyance and an intake-exhaust system disposed on the second conveyance; the intake-exhaust system includes an intake assembly, an exhaust duct, a lifting mechanism and a horizontal adjusting mechanism; the intake assembly and the exhaust duct are connected with each other, the lifting mechanism is configured to jack up the intake assembly and the exhaust duct as a whole, to be higher than a height of the power generation transport apparatus, and the horizontal adjusting mechanism is configured to drive the intake assembly and the exhaust duct to move along a transverse direction, so as to align the intake assembly and the exhaust duct with the power generation apparatus.

For example, in the mobile power generation system provided by an embodiment of the present disclosure, the power generation apparatus includes a gas turbine, a generator, an intake chamber and an exhaust collector, the power generation transport apparatus further includes an electric power unit, a control system, and an auxiliary system, the electric power unit is configured to output electric power from the generator, and the control system includes a gas turbine control unit and a generator control unit, and the auxiliary system is applied to the gas turbine and the generator.

For example, in the mobile power generation system provided by an embodiment of the present disclosure, the horizontal adjusting mechanism includes a retractable support mechanism for bearing the intake assembly and the exhaust duct, and configured to implement a horizontal movement of the intake assembly and the exhaust duct by its horizontal expansion.

For example, in the mobile power generation system provided by an embodiment of the present disclosure, the retractable support mechanism includes: a supporting frame, connected with the intake assembly and the exhaust duct; an expansion chamber, fixed on the supporting frame; an expansion support; and a horizontal hydraulic cylinder, including a fixed end and a movable end, one end of the expansion support is connected to the lifting mechanism, and the other end of the expansion support is partially disposed in the expansion chamber and movable in the expansion chamber along the second direction, the fixed end of the horizontal hydraulic cylinder is connected with the supporting frame and the movable end of the horizontal hydraulic cylinder is connected with the lifting mechanism and is configured to move along the second direction.

For example, in the mobile power generation system provided by an embodiment of the present disclosure, the lifting mechanism includes at least four lifting legs, configured to move outward the second conveyance and jack up the intake-exhaust system to be higher than a height of the power generation transport apparatus, each of the at least four lifting legs includes a vertical hydraulic cylinder, configured to jack up the intake assembly and the exhaust duct by its expansion, the retractable support mechanism includes a plurality of expansion groups, arranged along a jacking direction of the lifting mechanism, each of the plurality of expansion groups includes two expansion pairs, each of the two expansion pairs includes one expansion chamber and one expansion support, in each of the plurality of expansion groups, one of the two expansion pairs is connected with one of the at least four lifting legs, and the other one of the two expansion pairs is connected with another of the at least four lifting legs.

For example, in the mobile power generation system provided by an embodiment of the present disclosure, the retractable support mechanism includes two horizontal hydraulic cylinders, one of the two horizontal hydraulic cylinders is connected with one of the at least four lifting legs, and the other one of the two horizontal hydraulic cylinders is connected with another of the at least four lifting legs, the fixed end of one of the two horizontal hydraulic cylinders is connected with the fixed end of the other one of the two horizontal hydraulic cylinders.

At least one embodiment of the present disclosure further provides an intake-exhaust transport apparatus, comprising a second conveyance and an intake-exhaust system disposed on the second conveyance; the intake-exhaust system comprises an intake assembly, an exhaust duct, a lifting mechanism and a horizontal adjusting mechanism; the intake assembly and the exhaust duct are connected with each other, the lifting mechanism is configured to jack up the intake assembly and the exhaust duct as a whole, and the horizontal adjusting mechanism is configured to drive the intake assembly and the exhaust duct to move along a transverse direction.

BRIEF DESCRIPTION OF THE DRAWINGS

In order to more clearly illustrate the technical solution of the embodiments of the present disclosure, the drawings of the embodiments will be briefly described in the following. It is obvious that the described drawings below are only related to some embodiments of the present disclosure without constituting any limitation thereto.

DETAILED DESCRIPTION

Figure 1:
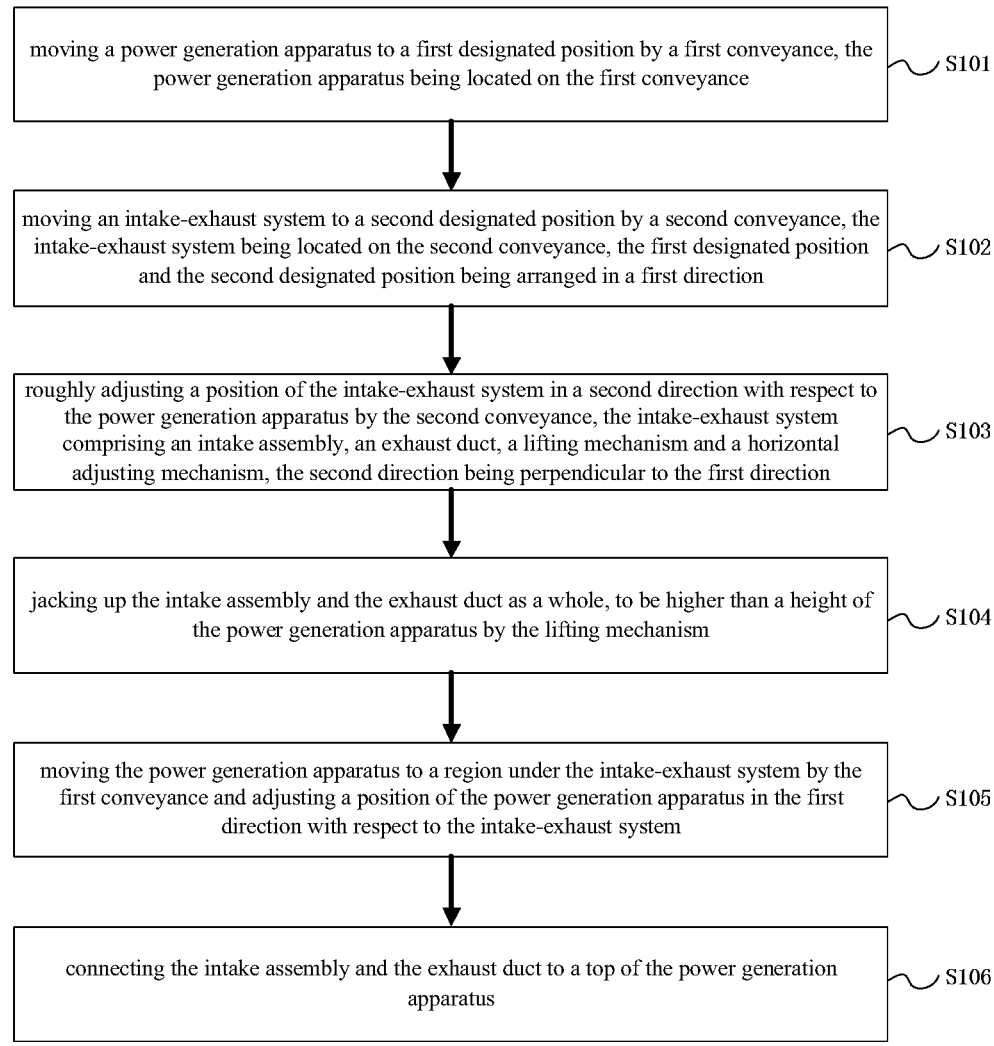
FIG. 1 is a flow chart of an assembling method of a mobile power generation system provided by an embodiment of the present disclosure.

In order to make objectives, technical details and advantages of the embodiments of the present disclosure more clearly, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects.

Generally, because various parts of a power supply system require different assembly, transportation and installation methods, the installation time of the power supply system will be up to half to one month. Therefore, how to provide a mobile power supply system which can be quickly and conveniently installed at the electrically-driven fracturing operation site is currently a great challenge for electrically-driven fracturing operations.

Embodiments of the present disclosure provide a mobile power generation system and an assembling method thereof. The assembling method includes: moving a power generation apparatus to a first designated position by a first conveyance, the power generation apparatus being located on the first conveyance; moving an intake-exhaust system to a second designated position by a second conveyance, the intake-exhaust system being located on the second conveyance, the first designated position and the second designated position being arranged in a first direction; roughly adjusting a position of the intake-exhaust system in a second direction with respect to the power generation apparatus by the second conveyance, the intake-exhaust system including an intake assembly, an exhaust duct, a lifting mechanism and a horizontal adjusting mechanism, the second direction being perpendicular to the first direction; jacking up the intake assembly and the exhaust duct as a whole, to be higher than a height of the power generation apparatus by the lifting mechanism; moving the power generation apparatus to a region under the intake-exhaust system by the first conveyance and adjusting a position of the power generation apparatus in the first direction with respect to the intake-exhaust system; adjusting the position of the intake assembly and the exhaust duct in the second direction with respect to the power generation apparatus by the horizontal adjusting mechanism; and connecting the intake assembly and the exhaust duct to a top of the power generation apparatus. The assembling method of the mobile power generation system can improve the assembling efficiency of the mobile power generation system, and reducing the assembling time.

Hereinafter, the mobile power generation system and the assembling method of the mobile power generation system provided by the embodiments of the present disclosure will be described with reference to the accompanying drawings.

An embodiment of the present disclosure provides an assembling method of a mobile power generation system. FIG. 1 is a flow chart of an assembling method of a mobile power generation system provided by the embodiment.

As illustrated by FIG. 1, the assembling method of the mobile power generation system includes the following steps S101-S106:

S101: moving a power generation apparatus to a first designated position by a first conveyance, the power generation apparatus being located on the first conveyance.

For example, the power generation apparatus is used to generate electric power by burning fossil fuels.

Figure 3:
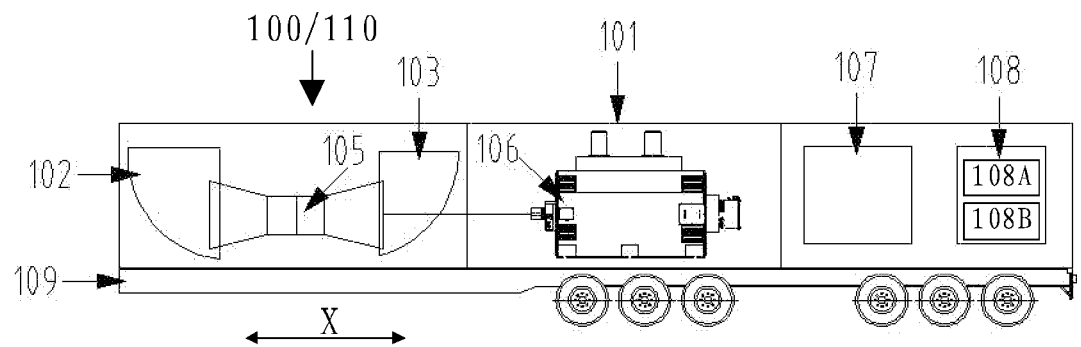
FIG. 3 is a schematic diagram of an internal structure of the power generation transport apparatus provided by an embodiment of the present disclosure.

S102: moving an intake-exhaust system to a second designated position by a second conveyance, the intake-exhaust system being located on the second conveyance, the first designated position and the second designated position being arranged in a first direction. For example, the first direction may be a main moving direction X of the first conveyance, as shown in FIG. 3.

Figure 5A:
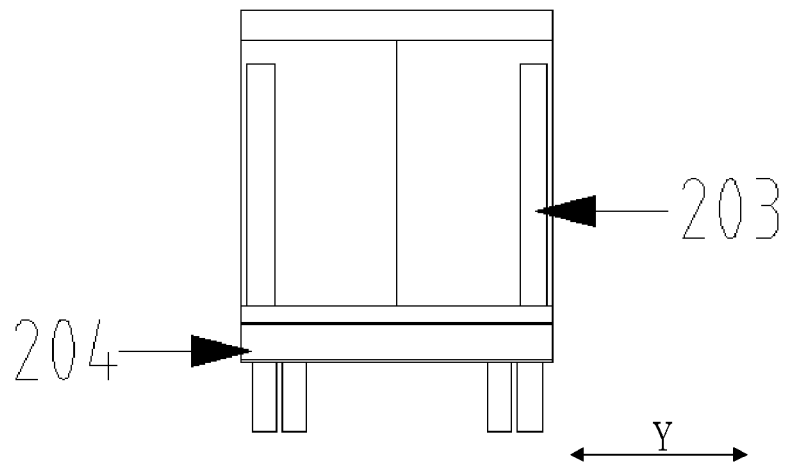
FIG. 5A is a back view of an intake-exhaust transport apparatus in a transportation state provided by an embodiment of the present disclosure.
Figure 5B:
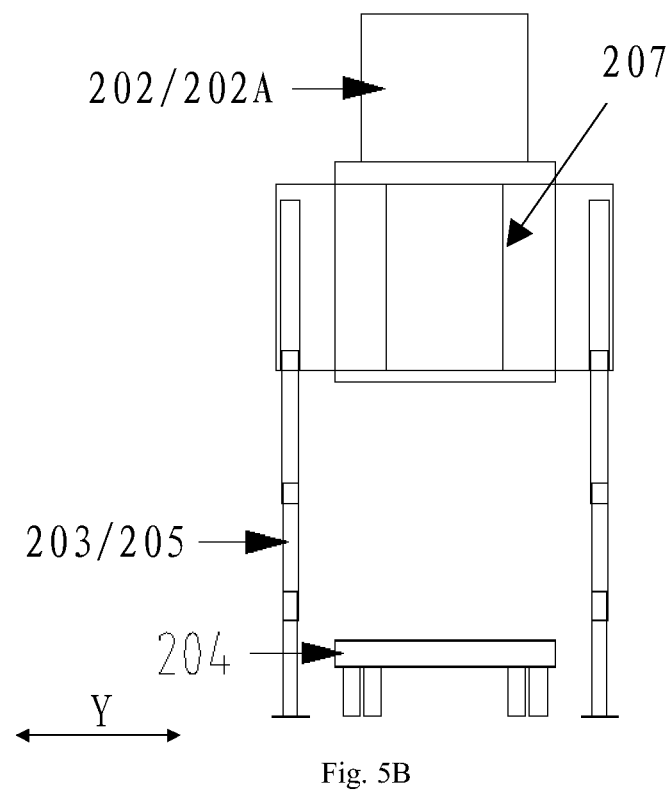
FIG. 5B is another back view of an intake-exhaust transport apparatus in a transportation state provided by an embodiment of the present disclosure.

S103: roughly adjusting a position of the intake-exhaust system in a second direction with respect to the power generation apparatus by the second conveyance, the intake-exhaust system including an intake assembly, an exhaust duct, a lifting mechanism and a horizontal adjusting mechanism, the second direction being perpendicular to the first direction. So that, the intake-exhaust system and the power generation apparatus can be roughly aligned. For example, the second direction may be a transverse direction Y perpendicular to the first direction X, as shown in FIG. 5A and FIG. 5B.

S104: jacking up the intake assembly and the exhaust duct as a whole, to be higher than a height of the power generation apparatus by the lifting mechanism.

S105: moving the power generation apparatus to a region under the intake-exhaust system by the first conveyance and adjusting a position of the power generation apparatus in the first direction with respect to the intake-exhaust system.

S106:

S106: connecting the intake assembly and the exhaust duct to a top of the power generation apparatus.

In the assembling method of the mobile power generation system provided by the embodiment of the present disclosure, because the power generation apparatus is disposed on the first conveyance, and the intake-exhaust system is disposed on the second conveyance, the whole mobile power generation system only needs two conveyances; besides, by jacking up the intake assembly and the exhaust duct by the lifting mechanism, moving the power generation apparatus to a region under the intake-exhaust system and adjusting a position of the power generation apparatus in the first direction with respect to the intake-exhaust system by the first conveyance, the intake assembly and the exhaust duct can be assembled onto the top of the power generation apparatus without other lifting apparatuses. Thus, the assembling method of the mobile power generation system can improve the assembling efficiency of the mobile power generation system, and reducing the assembling time.

On the other hand, after the lifting mechanism jacks up the intake assembly and the exhaust duct as a whole, to be higher than a height of the power generation apparatus, the intake-exhaust system does not need to adjust the position of the intake assembly and the exhaust duct in the first direction, which is adjusted by the first conveyance, so that the intake-exhaust system can have a relatively simple structure and light weight, so as to reduce the costs of the intake-exhaust system.

In some examples, before connecting the intake assembly and the exhaust duct to a top of the power generation apparatus, the assembling method further includes: adjusting the position of the intake assembly and the exhaust duct in the second direction with respect to the power generation apparatus by the horizontal adjusting mechanism. So that, by adjusting the position of the intake assembly and the exhaust duct in the second direction with respect to the power generation apparatus by the horizontal adjusting mechanism, the intake assembly and the exhaust duct can be precisely assembled onto the top of the power generation apparatus without other lifting apparatuses.

In some examples, the step of jacking up the intake assembly and the exhaust duct as a whole, to be higher than a height of the power generation apparatus by the lifting mechanism includes: separating the intake assembly and the exhaust duct from the second conveyance. In this way, upon jacking up the intake assembly and the exhaust duct, the second conveyance and the intake assembly and the exhaust duct are separated.

In some examples, the step of connecting the intake assembly and the exhaust duct to the top of the power generation apparatus includes: lowering the intake assembly and the exhaust duct as a whole to the top of the power generation apparatus and connecting the intake assembly and the exhaust duct to the top of the power generation apparatus. In this way, after the power generation apparatus moves to a region under the intake-exhaust system and the position of the power generation apparatus in the first direction has been adjusted, the intake assembly and the exhaust duct can be lowered as a whole to the top of the power generation apparatus, so as to be connected with the top of the power generation apparatus.

In some examples, the step of moving the power generation apparatus to a region under the intake-exhaust system by the first conveyance and adjusting a position of the power generation apparatus in the first direction with respect to the intake-exhaust system further includes: moving the second conveyance out of the region under the intake assembly and the exhaust duct which have been jacked up, so as to form a channel under the intake assembly and the exhaust duct to allow the first conveyance to pass through. In this way, the first conveyance can move into the channel and carry the power generation apparatus to the region under the intake-exhaust system.

Figure 2:
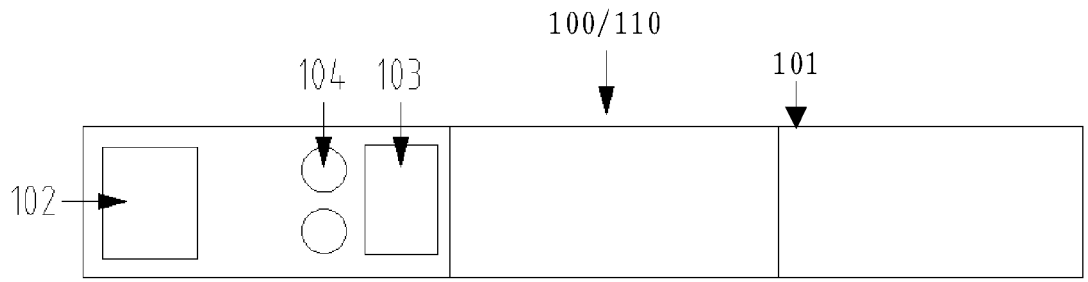
FIG. 2 is a top view of a power generation transport apparatus provided by an embodiment of the present disclosure.
Figure 4:
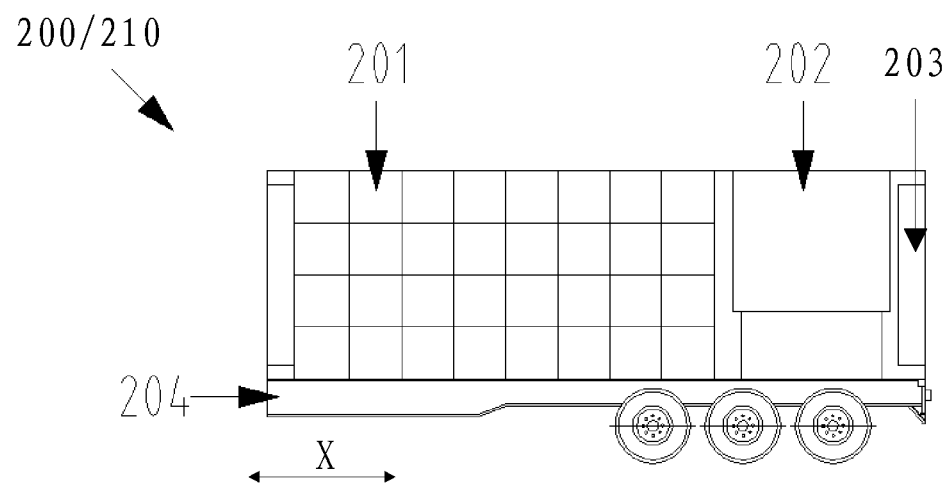
FIG. 4 is a schematic diagram of an intake-exhaust transport apparatus in a transportation state provided by an embodiment of the present disclosure.
Figure 6:
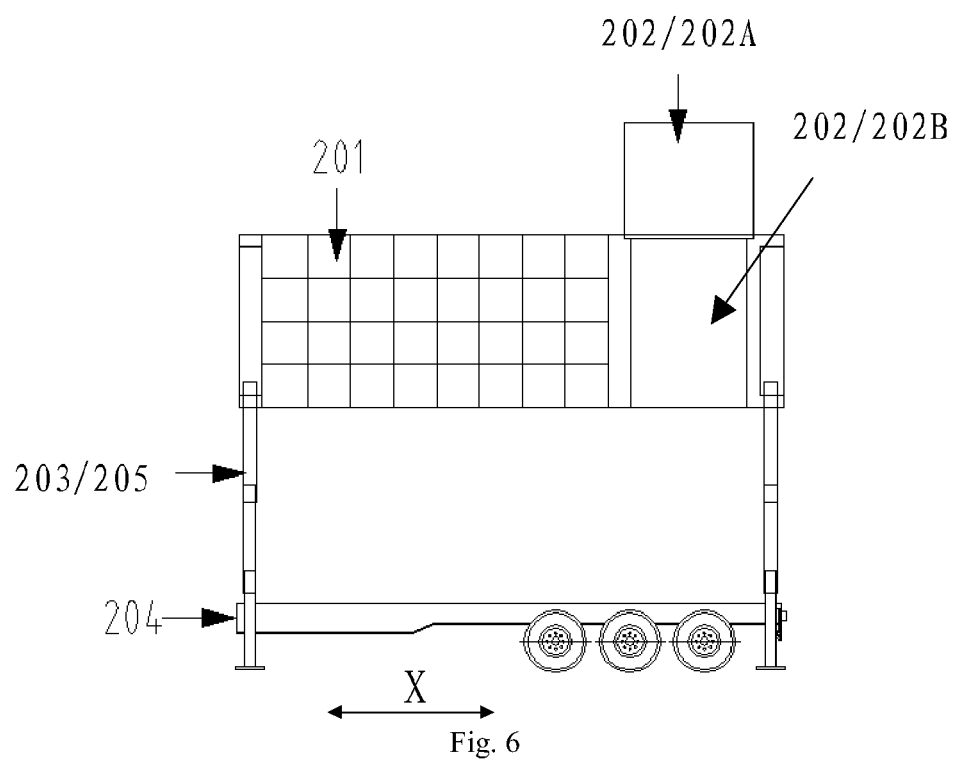
FIG. 6 is a schematic diagram of an intake-exhaust transport apparatus in a separation and docking state provided by an embodiment of the present disclosure.

FIG. 2 is a top view of a power generation transport apparatus provided by an embodiment of the present disclosure; FIG. 3 is a schematic diagram of an internal structure of the power generation transport apparatus provided by an embodiment of the present disclosure; FIG. 4 is a schematic diagram of an intake-exhaust transport apparatus in a transportation state provided by an embodiment of the present disclosure; FIG. 5A is a back view of an intake-exhaust transport apparatus in a transportation state provided by an embodiment of the present disclosure; FIG. 5B is another back view of an intake-exhaust transport apparatus in a transportation state provided by an embodiment of the present disclosure; FIG. 6 is a schematic diagram of an intake-exhaust transport apparatus in a separation and docking state provided by an embodiment of the present disclosure; and FIG. 7 is a schematic diagram of a mobile power generation system provided by an embodiment of the present disclosure.

As illustrated by FIG. 2 and FIG. 3, the power generation transport apparatus 100 includes a first conveyance 109 and a power generation apparatus 110 located on the first conveyance 109. The power generation apparatus 110 includes a gas turbine 105, a generator 106, an intake chamber 102 and an exhaust collector 103. For example, the intake chamber 102 includes a ventilation intake 104.

As illustrated by FIG. 4, FIG. 5A, FIG. 5B and FIG. 6, the intake-exhaust transport apparatus 200 includes a second conveyance 204 and an intake-exhaust system 210 located on the second conveyance 204. The intake-exhaust system 210 includes an intake assembly 201, an exhaust duct 202, a lifting mechanism 203, and a horizontal adjusting mechanism 207.

Figure 7:
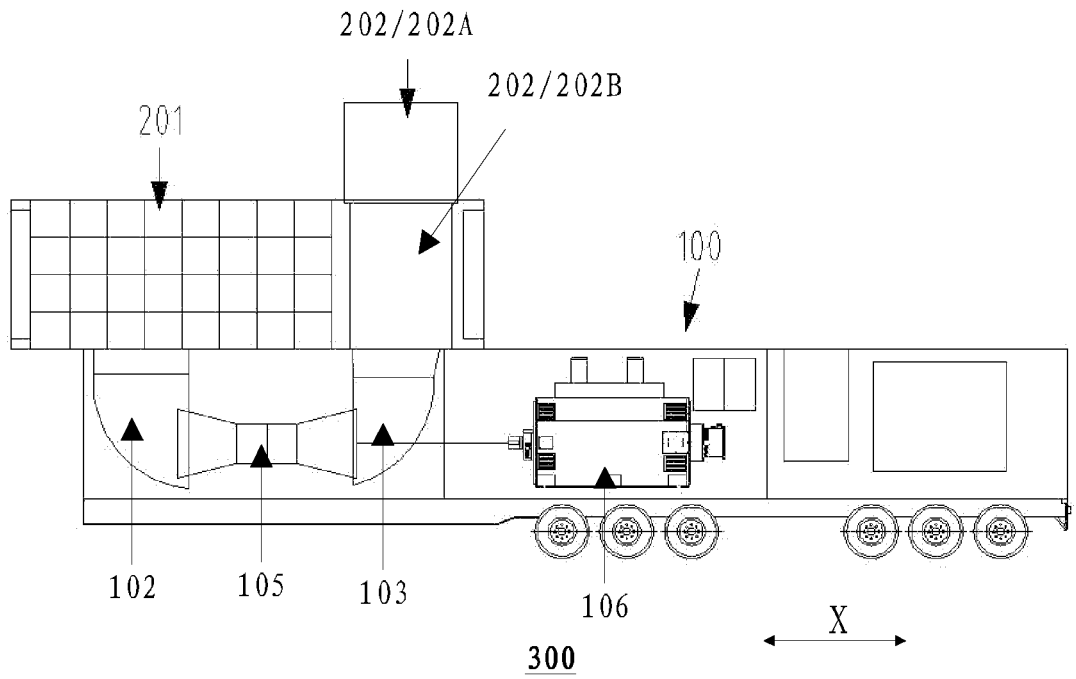
FIG. 7 is a schematic diagram of a mobile power generation system provided by an embodiment of the present disclosure.

In this way, as illustrated by FIG. 7, the step of connecting the intake assembly and the exhaust duct to the top of the power generation apparatus includes: connecting the intake assembly 201 with the intake chamber 102, and connecting the exhaust duct 202 with the exhaust collector 103. So that, the gas turbine 105 can use the intake chamber 102 and the intake assembly 201 to intake air and generate mechanical energy by burning fossil fuels, and the generator 106 connected with the gas turbine 105 can used the mechanical energy to produce electric power. At the same time, the exhaust collector and the exhaust duct can discharge the flue gas from the gas turbine.

In some examples, as illustrated by FIG. 4, FIG. 5A, FIG. 5B and FIG. 6, the exhaust duct 202 includes an exhaust stack 202A and an exhaust silencer 202B, during transportation, the exhaust stack 202A is sleeved outside the exhaust silencer 202B, the assembling method further includes: lifting the exhaust stack upwards to a top of the exhaust silencer, so as to avoid the flue gas discharged by the exhaust stack being intake by introduced by the intake assembly 201.

Figure 8:
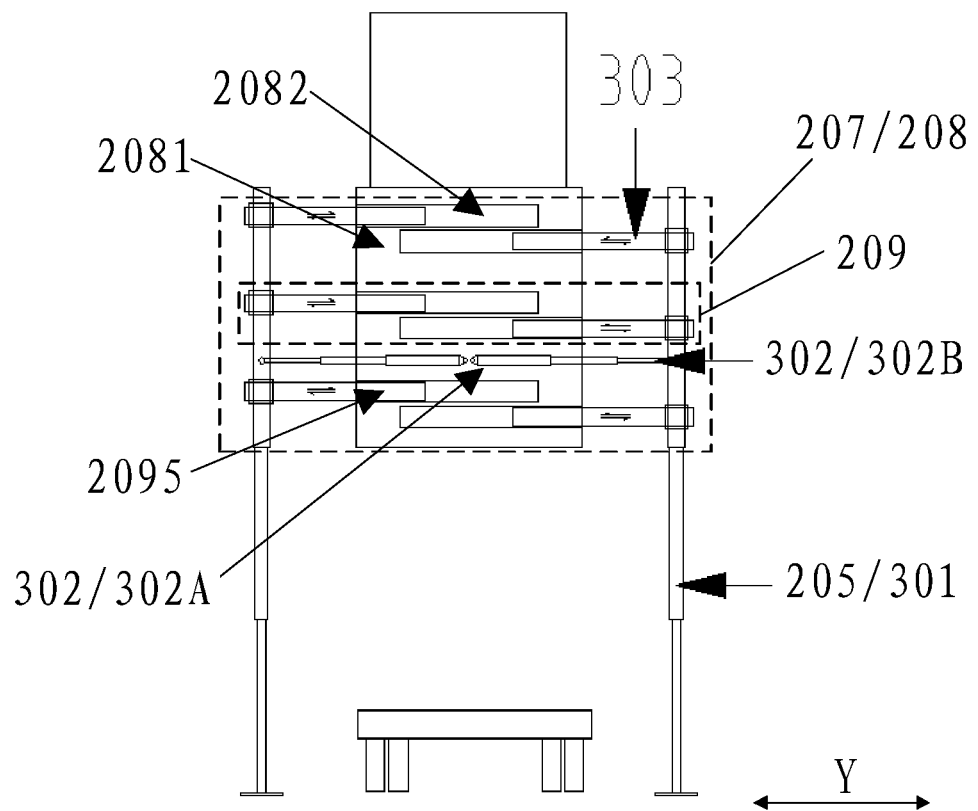
FIG. 8 is a schematic diagram of an intake-exhaust transport apparatus in a separation and docking state provided by an embodiment of the present disclosure.

FIG. 8 is a schematic diagram of an intake-exhaust transport apparatus in a separation and docking state provided by an embodiment of the present disclosure. As illustrated by FIG. 8, the horizontal adjusting mechanism 207 includes a retractable support mechanism 208 for bearing the intake assembly 201 and the exhaust duct 202, and configured to implement a horizontal movement of the intake assembly 201 and the exhaust duct 202 by its horizontal expansion.

As illustrated by FIG. 8, the retractable support mechanism 208 includes a supporting frame 2081, an expansion chamber 2082, an expansion support 303, and a horizontal hydraulic cylinder 302; the supporting frame 2081 is connected with the intake assembly 201 and the exhaust duct 202; the expansion chamber 303 is fixed on the supporting frame 2081, the horizontal hydraulic cylinder 302 includes a fixed end 302A and a movable end 302B, one end of the expansion support 303 is connected to the lifting mechanism 203, and the other end of the expansion support 303 is partially disposed in the expansion chamber 303 and movable in the expansion chamber 303 along the second direction, the fixed end 302A of the horizontal hydraulic cylinder 302 is connected with the supporting frame 2081 and the movable end 302B of the horizontal hydraulic cylinder 302 is connected with the lifting mechanism 203 and is configured to move along the second direction.

In some examples, as illustrated by FIG. 8, the step of adjusting the position of the intake assembly and the exhaust duct in the second direction with respect to the power generation apparatus by the horizontal adjusting mechanism includes: stabilizing the intake assembly and the exhaust duct along the second direction with the expansion chamber and the expansion support; and driving the support frame to move along the second direction by the horizontal hydraulic cylinder to adjust the position of the intake assembly and the exhaust duct in the second direction with respect to the power generation apparatus. In this way, power generation apparatus and the intake assembly and the exhaust duct can be precisely aligned, so as to connect the intake assembly and the exhaust duct on the top of the power generation apparatus.

In some examples, as illustrated by FIG. 6 and FIG. 8, the lifting mechanism 203 includes at least four lifting legs 205, configured to move outward the second conveyance 204 and jack up the intake-exhaust system 210 to be higher than a height of the power generation transport apparatus 110, each of the at least four lifting legs 205 includes a vertical hydraulic cylinder 301, configured to jack up the intake assembly 201 and the exhaust duct 202 by its expansion.

In some examples, as illustrated by FIG. 8, the retractable support mechanism 208 includes a plurality of expansion groups 209, arranged along a jacking direction of the lifting mechanism 204, each of the plurality of expansion groups 209 includes two expansion pairs 2095, each of the two expansion pairs 2095 includes one expansion chamber 2082 and one expansion support 303, in each of the plurality of expansion groups 209, one of the two expansion pairs 2095 is connected with one of the at least four lifting legs 205, and the other one of the two expansion pairs 2095 is connected with another of the at least four lifting legs 205.

In some examples, as illustrated by FIG. 8, the retractable support mechanism 208 includes two horizontal hydraulic cylinders 302, one of the two horizontal hydraulic cylinders 302 is connected with one of the at least four lifting legs 205, and the other one of the two horizontal hydraulic cylinders 302 is connected with another of the at least four lifting legs 205.

In some examples, as illustrated by FIG. 8, the fixed end 302A of one of the two horizontal hydraulic cylinders 302 is connected with the fixed end 302A of the other one of the two horizontal hydraulic cylinders 302.

An embodiment of the present disclosure further provides a mobile power generation system 300, which includes a power generation transport apparatus 100 and an intake-exhaust transport apparatus 200; the power generation transport apparatus 100 includes a first conveyance 109 and a power generation apparatus 110 disposed on the first conveyance 109; the intake-exhaust transport apparatus 200 includes a second conveyance 204 and an intake-exhaust system 210 disposed on the second conveyance 204; the intake-exhaust system 210 includes an intake assembly 201, an exhaust duct 202, a lifting mechanism 203, and a horizontal adjusting mechanism 207; the intake assembly 201 and the exhaust duct 202 are connected with each other, the lifting mechanism 203 is configured to jack up the intake assembly 201 and the exhaust duct 202 as a whole, to be higher than a height of the power generation transport apparatus 100, and the horizontal adjusting mechanism 207 is configured to drive the intake assembly 201 and the exhaust duct 202 to move along a transverse direction, so as to align the intake assembly 201 and the exhaust duct 202 with the power generation apparatus 110.

In some examples, as illustrated by FIG. 2 and FIG. 3, the power generation apparatus 110 includes a gas turbine 105, a generator 106, an intake chamber 102 and an exhaust collector 103; the power generation transport apparatus 100 further includes an electric power unit 107 and a control system 108, the electric power unit 107 is configured to output electric power from the generator 106, and the control system 108 includes a gas turbine control unit 108A and a generator control unit 108B, and the gas turbine control unit 108A is used to control the gas turbine 105, and the generator control unit 108B is used to control the generator 106.

In some examples, as illustrated by FIG. 8, the horizontal adjusting mechanism 207 includes a retractable support mechanism 208 for bearing the intake assembly 201 and the exhaust duct 202, and configured to implement a horizontal movement of the intake assembly 201 and the exhaust duct 202 by its horizontal expansion.

As illustrated by FIG. 8, the retractable support mechanism 208 includes a supporting frame 2081, an expansion chamber 2082, an expansion support 303, and a horizontal hydraulic cylinder 302; the supporting frame 2081 is connected with the intake assembly 201 and the exhaust duct 202; the expansion chamber 303 is fixed on the supporting frame 2081, the horizontal hydraulic cylinder 302 includes a fixed end 302A and a movable end 302B, one end of the expansion support 303 is connected to the lifting mechanism 203, and the other end of the expansion support 303 is partially disposed in the expansion chamber 303 and movable in the expansion chamber 303 along the second direction, the fixed end 302A of the horizontal hydraulic cylinder 302 is connected with the supporting frame 2081 and the movable end 302B of the horizontal hydraulic cylinder 302 is connected with the lifting mechanism 203 and is configured to move along the second direction.

In some examples, In some examples, as illustrated by FIG. 6 and FIG. 8, the lifting mechanism 203 includes at least four lifting legs 205, configured to move outward the second conveyance 204 and jack up the intake-exhaust system 210 to be higher than a height of the power generation transport apparatus 110, each of the at least four lifting legs 205 includes a vertical hydraulic cylinder 301, configured to jack up the intake assembly 201 and the exhaust duct 202 by its expansion.

In some examples, as illustrated by FIG. 8, the retractable support mechanism 208 includes a plurality of expansion groups 209, arranged along a jacking direction of the lifting mechanism 204, each of the plurality of expansion groups 209 includes two expansion pairs 2095, each of the two expansion pairs 2095 includes one expansion chamber 2082 and one expansion support 303, in each of the plurality of expansion groups 209, one of the two expansion pairs 2095 is connected with one of the at least four lifting legs 205, and the other one of the two expansion pairs 2095 is connected with another of the at least four lifting legs 205.

In some examples, as illustrated by FIG. 8, the retractable support mechanism 208 includes two horizontal hydraulic cylinders 302, one of the two horizontal hydraulic cylinders 302 is connected with one of the at least four lifting legs 205, and the other one of the two horizontal hydraulic cylinders 302 is connected with another of the at least four lifting legs 205.

In some examples, as illustrated by FIG. 8, the fixed end 302A of one of the two horizontal hydraulic cylinders 302 is connected with the fixed end 302A of the other one of the two horizontal hydraulic cylinders 302.

An embodiment of the present disclosure further provides an intake-exhaust transport apparatus 100, which includes a second conveyance 204 and an intake-exhaust system 210 located on the second conveyance 204. The intake-exhaust system 210 includes an intake assembly 201, an exhaust duct 202, a lifting mechanism 203, and a horizontal adjusting mechanism 207. The intake assembly 201 and the exhaust duct 202 are connected with each other, the lifting mechanism 203 is configured to jack up the intake assembly 201 and the exhaust duct 202 as a whole, and the horizontal adjusting mechanism 207 is configured to drive the intake assembly 201 and the exhaust duct 202 to move along a transverse direction.

In the intake-exhaust transport apparatus provided by the embodiment of the present disclosure, the intake-exhaust transport apparatus can jack up the intake assembly and the exhaust duct by the lifting mechanism, and adjust the position of the intake assembly and the exhaust duct in the second direction with respect to the power generation apparatus by the horizontal adjusting mechanism, so that the intake assembly and the exhaust duct can be precisely assembled onto the top of the power generation apparatus without other lifting apparatuses.

To overcome the deficiencies in the existing art, another objective of the present invention is to provide a mobile power generation system, the whole power generation system is assigned onto two conveyances. A gas turbine, a generator, an intake chamber, an exhaust collector, and an auxiliary system are disposed on the first conveyance, an intake assembly and an exhaust duct are integrally disposed on a second conveyance. The second conveyance further includes at least four lifting gears, which are configured to separate the intake assembly and the exhaust duct from the second conveyance, and jack up the intake assembly and the exhaust duct so as to accommodate the power generation transport apparatus and move it to the bottom of the intake assembly and the exhaust duct. The intake assembly and the exhaust duct are then brought down by the lifting gears to dock with the intake chamber and the exhaust collector respectively. A seal docking can be achieved by the weights of the intake assembly and the exhaust duct themselves. For the overall technical solution, the design is simple (the whole power generation system is only assigned onto two conveyances, occupying a small area, with less transportation energy consumption, and a compact structure), the installation is quick and convenient (it is only need to separate and jack up the intake-exhaust system in the intake-exhaust transport apparatus, and then move the power generation transport apparatus to the bottom of the intake-exhaust system, so as to implement the installation and docking of the power generation system).

The objective of the present invention is achieved by the following technical measures: a mobile power generation system, including a power generation transport apparatus and an intake-exhaust transport apparatus, the power generation transport apparatus includes a gas turbine, a generator, an intake chamber, an exhaust collector, an auxiliary system and a first conveyance, the auxiliary system is applied to the gas turbine and the generator; the intake-exhaust transport apparatus includes an intake-exhaust system and a second conveyance, the intake-exhaust system and the second conveyance are separably connected, the intake-exhaust system includes an intake assembly and an exhaust duct, and the intake assembly and the exhaust duct are integrally transferred and connected to the top of the power generation transport apparatus.

Further, the intake assembly and the exhaust duct are transferred and jacked up as a whole by at least four lifting gears.

Further, the lifting gears include supporting legs, a horizontal hydraulic cylinder and a vertical hydraulic cylinder, the horizontal hydraulic cylinder is configured to implement the horizontal movement of the supporting legs, and the vertical hydraulic cylinder is configured to implement the vertical expansion of the supporting legs.

Further, the supporting legs can move outward the second conveyance, and can jack up the intake assembly and the exhaust duct, the jack-up height of the supporting legs is greater than the height of the power generation transport apparatus.

Further, the power generation transport apparatus further includes an electric power unit and a control system, the electric power unit is configured to output electric power from the generator, and the control system includes a gas turbine control unit and a generator control unit.

Further, the exhaust duct includes an exhaust stack and an exhaust silencer, during transportation, the exhaust stack is sleeved outside the exhaust silencer, while in working state, the exhaust stack is disposed on the top of the exhaust silencer.

Compared with the prior art, the present invention has the following beneficial effects: For the overall technical solution, the design is simple (the whole power generation system is only assigned onto two conveyances, occupying a small area, with less transportation energy consumption, and a compact structure), the installation is quick and convenient (it is only need to separate and jack up the intake-exhaust system in the intake-exhaust transport apparatus, and then move the power generation transport apparatus to the bottom of the intake-exhaust system, so as to implement the installation and docking of the power generation system). The docking port is sealed by the equipment's own weight, with the sealing convenient and reliable. After installation and docking, the power generation system in working state is top mounted, thus greatly reducing the occupied area of the whole power generation system.

The present invention will be described in detail below with reference to the accompanying drawings and specific implementations As used herein, the term "conveyance" refers to any transportation unit, including a trailer, a truck, a skid or a barge used for large tonnage gravity transportation.

As used herein, the term "intake chamber" can be replaced throughout the disclosure, and is called "inlet", "air intake port" and "intake chamber" in general. In addition, the term "exhaust collector" can be replaced throughout the disclosure, and is called "exhaust diffuser" and "exhaust chamber" in general.

A mobile power generation system, including a power generation transport apparatus 100 and an intake-exhaust transport apparatus 200, the power generation transport apparatus 100 includes a gas turbine 105, a generator 106, an intake chamber 102, an exhaust collector 103, an auxiliary system and a first conveyance 109; the auxiliary system is applied to the gas turbine 105 and the generator 106, the auxiliary system includes a turbine lubrication system, a fire fighting system and a generator lubrication system and the like. The intake-exhaust transport apparatus 200 includes an intake-exhaust system and a second conveyance 204, the intake-exhaust system and the second conveyance 204 are separably connected, the intake-exhaust system includes an intake assembly 201 and an exhaust duct 202, the intake assembly 201 and the exhaust duct 202 are integrally transferred and connected to the top of the power generation transport apparatus 100. The intake assembly 201 and the exhaust duct 202 are disposed on a conveyance in combination, improving the ease of transportation.

Plentiful and inexpensive hydrocarbon fuels (for example, natural gas) at the oil and gas well-site are used as fuels for the gas turbine 105, which transforms chemical energy of hydrocarbon fuels to mechanical energy. Then the generator 106 transforms the mechanical energy into electric energy, thus achieving an efficient, stable, and mobile supply of electric energy to the electrically-driven fracturing operation site. The intake-exhaust system is transferred and jacked up as a whole by at least four lifting gears 203. The mobile power generation system can implement the quick and convenient installation and docking of a complete set of the power generation system depending on its own lifting gears 203, without the need of additional auxiliary equipment (such as crane, lifter, etc.), thus effectively reducing the time of installation. The four lifting gears 203 are disposed on the four corners of the intake-exhaust system.

The lifting gears 203 include supporting legs 205 and retractable support mechanisms. The supporting legs 205 are composed of vertical hydraulic cylinders 301. The extension of the vertical hydraulic cylinders 301 bring about the jacking up of the intake-exhaust system. The retractable support mechanisms are used to support the intake-exhaust system, and push the vertical hydraulic cylinders 301 outwards through their own horizontal expansion, i.e., to implement the horizontal movement of the supporting legs 205. When docking, the retractable support mechanisms can retract to one side at the same time to adjust the intake-exhaust system to move to the left or the right.

The supporting legs 205 can move outward the second conveyance 204, and can jack up the intake assembly 201 and the exhaust duct 202, the jack-up height of the supporting legs 205 is greater than the height of the power generation transport apparatus 100.

The power generation transport apparatus 100 further includes an electric power unit 107 and a control system 108, the electric power unit 107 is configured to output electric power from the generator 106, and the control system 108 includes a gas turbine control unit and a generator control unit.

As shown in FIG. 2, the power generation transport apparatus 100 has a turbine housing 101. The shown turbine housing 101 is provided with a ventilation intake 104, a port of an intake chamber 102, and a port of an exhaust collector 103.

As shown in FIG. 3, the power generation transport apparatus 100 is provided with an intake chamber 102, a gas turbine 105, an exhaust collector 103, a generator 106, an electric power unit 107 and a control system 108 inside the turbine housing 101; the gas turbine 105 is connected to the generator 106, the electric power unit 107 and the control system 108 are connected to the intake chamber 102 and the exhaust collector 103 on the gas turbine 105. The exhaust duct 202 in the intake-exhaust system is docked with the port of the exhaust collector 103, and the intake assembly 201 in the intake-exhaust system is docked with the port of the intake chamber 102.

As shown in FIG. 4, the second conveyance 204 is provided with an intake assembly 201 and an exhaust duct 202 concurrently. The intake assembly 201 is configured to provide combustion air and gas-turbine-chamber ventilation air. The intake assembly 201 includes an intake filter, an intake silencer and a ventilation fan, the ventilation fan is connected to the ventilation intake 104 on the turbine housing 101. The exhaust duct 202 includes an exhaust silencer and an exhaust stack. During transportation, the exhaust stack is sleeved outside the exhaust silencer, i.e., the exhaust stack dose not occupy vertical height space, the height of the whole intake-exhaust transport apparatus 200 meets the requirements of road transportation.

As shown in FIG. 5A, the lifting gears 203 are unexpanded at that time, i.e., the supporting legs 205 neither move outward the second conveyance 204, nor jack up the intake-exhaust system upwards. The second conveyance 204 bears the total weight of the lifting gears 203, the intake assembly 201 and the exhaust duct 202.

As shown in FIG. 5B, the lifting gears 203 have expanded at that time, the supporting legs 205 move outward the second conveyance 204, and jack up the intake-exhaust system upwards, so that the second conveyance 204 is separated from the intake-exhaust system completely. The exhaust stack moves upwards through a lifting mechanism, and is disposed on the top of the exhaust silencer. Due to that the exhaust duct 202 and the intake assembly 201 are disposed on the same conveyance closely, to avoid the exhaust from being sucked into the intake assembly 201 after discharge, it is necessary to elevate the distance between the exhaust stack and the intake assembly 201. The lifting mechanism includes, but not limited to, a hydraulic cylinder.

As shown in FIG. 6, the intake-exhaust system has been separated from the second conveyance 204 completely by the lifting gears 203.

As shown in FIG. 7, the intake-exhaust system has been mounted on the top of the power generation transport apparatus 100, that is, the working state of the power generation system has been achieved to supply power to electrically-driven fracturing sites.

As shown in FIG. 8, the retractable support mechanism is configured to bear the intake-exhaust system, the retractable support mechanism includes a supporting frame, an expansion chamber, an expansion support 303 and a horizontal hydraulic cylinder 302, etc. The vertical hydraulic cylinder 301 is connected with the horizontal hydraulic cylinder 302, one end of the expansion support 303 is connected to the vertical hydraulic cylinder 301, and the other end of the expansion support 303 is connected to the expansion chamber, so that the expansion support 303 can stretch in the expansion chamber.

A method of the mobile power generation system, including: moving the intake-exhaust transport apparatus 200 to a designated position at a user site, jacking up the exhaust stack to the top of the exhaust silencer, separating the intake-exhaust system from the second conveyance 204 by using the lifting gears 203, the lifting height is greater than the height of the power generation transport apparatus 100; moving away the second conveyance 204, and moving the power generation transport apparatus 100 to the bottom of the intake-exhaust system; the position of the power generation transport apparatus 100 is adjusted on the travelling direction, the intake-exhaust system is horizontally adjusted through the horizontal hydraulic cylinder 302 so that the port of the intake chamber 102 and the port of the exhaust collector 103 on the power generation transport apparatus 100 correspond to the port of the intake assembly 201 and the port of the exhaust duct 202 respectively; the intake-exhaust system is brought down through the vertical hydraulic cylinder 301 in the lifting gears 203, so that the port of the intake assembly 201 is docked with the port of the intake chamber 102, and the port of the exhaust duct 202 is docked with the port of the exhaust collector 103, i.e., the whole power generation system goes into the working state.

It will be appreciated to persons skilled in the art that the present invention is not limited to the foregoing embodiments, which together with the context described in the specification are only used to illustrate the principle of the present invention. Various changes and improvements may be made to the present invention without departing from the spirit and scope of the present invention. All these changes and improvements shall fall within the protection scope of the present invention. The protection scope of the present invention is defined by the appended claims and equivalents thereof.

It is to be noted that:

(1) In the drawings of the embodiments of the present disclosure, only the structures related to the embodiments of the present disclosure are involved, and other structures may refer to the common design(s).

(2) In case of no conflict, features in one embodiment or in different embodiments of the present disclosure can be combined.

The above are merely particular embodiments of the present disclosure but are not limitative to the scope of the present disclosure; the scopes of the present disclosure should be defined in the appended claims.

The invention claimed is:

1. An assembling method of a mobile power generation system, comprising:
    moving a power generation apparatus to a first designated position by a first conveyance, the power generation apparatus being located on the first conveyance;
    moving an intake-exhaust system to a second designated position by a second conveyance, the intake-exhaust system being located on the second conveyance, the first designated position and the second designated position being arranged in a first direction;
    roughly adjusting a position of the intake-exhaust system in a second direction with respect to the power generation apparatus by the second conveyance, the intake-exhaust system comprising an intake assembly, an exhaust duct, a lifter and a horizontal adjuster, the second direction being perpendicular to the first direction;
    jacking up the intake assembly and the exhaust duct as a whole, to be higher than a height of the power generation apparatus by the lifter;
    moving the power generation apparatus to a region under the intake-exhaust system by the first conveyance and adjusting a position of the power generation apparatus in the first direction with respect to the intake-exhaust system; and
    connecting the intake assembly and the exhaust duct to a top of the power generation apparatus,
    wherein the horizontal adjuster comprises a retractable support structure for bearing the intake assembly and the exhaust duct, and configured to implement a horizontal movement of the intake assembly and the exhaust duct by its horizontal expansion, and
    the retractable support structure comprises:
    a supporting frame, connected with the intake assembly and the exhaust duct;
    an expansion chamber, fixed on the supporting frame;
    an expansion support; and
    a horizontal hydraulic cylinder, comprising a fixed end and a movable end,
    wherein one end of the expansion support is connected to the lifter, and the other end of the expansion support is partially disposed in the expansion chamber and movable in the expansion chamber along the second direction, and
    the fixed end of the horizontal hydraulic cylinder is connected with the supporting frame and the movable end of the horizontal hydraulic cylinder is connected with the lifter and is configured to move along the second direction.

2. The assembling method of the mobile power generation system according to claim 1, wherein, before connecting the intake assembly and the exhaust duct to the top of the power generation apparatus, the assembling method comprises:
    adjusting the position of the intake assembly and the exhaust duct in the second direction with respect to the power generation apparatus by the horizontal adjuster.

3. The assembling method of the mobile power generation system according to claim 1, wherein jacking up the intake assembly and the exhaust duct as a whole, to be higher than a height of the power generation apparatus by the lifter comprises:
    separating the intake assembly and the exhaust duct from the second conveyance; and
    connecting the intake assembly and the exhaust duct to the top of the power generation apparatus comprises:
    lowering the intake assembly and the exhaust duct as a whole to the top of the power generation apparatus and connecting the intake assembly and the exhaust duct to the top of the power generation apparatus.

4. The assembling method of the mobile power generation system according to claim 1, wherein moving the power generation apparatus to a region under the intake-exhaust system by the first conveyance and adjusting a position of the power generation apparatus in the first direction with respect to the intake-exhaust system further comprises:

moving the second conveyance out of the region under the intake assembly and the exhaust duct which have been jacked up, so as to form a channel under the intake assembly and the exhaust duct to allow the first conveyance to pass through.

5. The assembling method of the mobile power generation system according to claim 1, wherein the power generation apparatus comprises a gas turbine, a generator, an intake chamber and an exhaust collector.

6. The assembling method of the mobile power generation system according to claim 1, wherein adjusting the position of the intake assembly and the exhaust duct in the second direction with respect to the power generation apparatus by the horizontal adjuster comprises:
stabilizing the intake assembly and the exhaust duct along the second direction with the expansion chamber and the expansion support; and
driving the support frame to move along the second direction by the horizontal hydraulic cylinder to adjust the position of the intake assembly and the exhaust duct in the second direction with respect to the power generation apparatus.

7. The assembling method of the mobile power generation system according to claim 1, wherein the lifter comprises at least four lifting legs, configured to move outward the second conveyance and jack up the intake-exhaust system to be higher than a height of the power generation transport apparatus,
each of the at least four lifting legs comprises a vertical hydraulic cylinder, configured to jack up the intake assembly and the exhaust duct by its expansion.

8. The assembling method of the mobile power generation system according to claim 1, wherein the retractable support structure comprises a plurality of expansion groups, arranged along a jacking direction of the lifter, each of the plurality of expansion groups comprises two expansion pairs, each of the two expansion pairs comprises one expansion chamber and one expansion support,
in each of the plurality of expansion groups, one of the two expansion pairs is connected with one of the at least four lifting legs, and the other one of the two expansion pairs is connected with another of the at least four lifting legs.

9. The assembling method of the mobile power generation system according to claim 1, wherein the retractable support structure comprises two horizontal hydraulic cylinders, one of the two horizontal hydraulic cylinders is connected with one of the at least four lifting legs, and the other one of the two horizontal hydraulic cylinders is connected with another of the at least four lifting legs.

10. The assembling method of the mobile power generation system according to claim 9, wherein the fixed end of one of the two horizontal hydraulic cylinders is connected with the fixed end of the other one of the two horizontal hydraulic cylinders.

11. The assembling method of the mobile power generation system according to claim 1, wherein the exhaust duct comprises an exhaust stack and an exhaust silencer, during transportation, the exhaust stack is sleeved outside the exhaust silencer, the assembling method further comprises:
lifting the exhaust stack upwards to a top of the exhaust silencer.

12. A mobile power generation system, comprises:
a power generation transport apparatus, comprising a first conveyance and a power generation apparatus disposed on the first conveyance;
an intake-exhaust transport apparatus, comprising a second conveyance and an intake-exhaust system disposed on the second conveyance;
wherein the intake-exhaust system comprises an intake assembly, an exhaust duct, a lifter and a horizontal adjuster; the intake assembly and the exhaust duct are connected with each other, the lifter is configured to jack up the intake assembly and the exhaust duct as a whole, to be higher than a height of the power generation transport apparatus, and the horizontal adjuster is configured to drive the intake assembly and the exhaust duct to move along a transverse direction, so as to align the intake assembly and the exhaust duct with the power generation apparatus,
wherein the horizontal adjuster comprises a retractable support structure for bearing the intake assembly and the exhaust duct, and configured to implement a horizontal movement of the intake assembly and the exhaust duct by its horizontal expansion, and
the retractable support structure comprises:
a supporting frame, connected with the intake assembly and the exhaust duct;
an expansion chamber, fixed on the supporting frame;
an expansion support; and
a horizontal hydraulic cylinder, comprising a fixed end and a movable end,
wherein one end of the expansion support is connected to the lifter, and the other end of the expansion support is partially disposed in the expansion chamber and movable in the expansion chamber along the second direction, and
the fixed end of the horizontal hydraulic cylinder is connected with the supporting frame and the movable end of the horizontal hydraulic cylinder is connected with the lifter and is configured to move along the second direction.

13. The mobile power generation system according to claim 12, wherein the power generation apparatus comprises a gas turbine, a generator, an intake chamber and an exhaust collector,
the power generation transport apparatus further comprises an electric power structure, a controller, and an auxiliary system, the electric power structure outputs electric power from the generator, and the controller comprises a gas turbine controller and a generator controller.

14. The mobile power generation system according to claim 12, wherein the lifter comprises at least four lifting legs, configured to move outward the second conveyance and jack up the intake-exhaust system to be higher than a height of the power generation transport apparatus, each of the at least four lifting legs comprises a vertical hydraulic cylinder, configured to jack up the intake assembly and the exhaust duct by its expansion,
the retractable support structure comprises a plurality of expansion groups, arranged along a jacking direction of the lifter, each of the plurality of expansion groups comprises two expansion pairs, each of the two expansion pairs comprises one expansion chamber and one expansion support,
in each of the plurality of expansion groups, one of the two expansion pairs is connected with one of the at least four lifting legs, and the other one of the two expansion pairs is connected with another of the at least four lifting legs.

15. The mobile power generation system according to claim 14, wherein the retractable support structure comprises two horizontal hydraulic cylinders, one of the two horizontal hydraulic cylinders is connected with one of the at least four lifting legs, and the other one of the two horizontal hydraulic cylinders is connected with another of the at least four lifting legs, the fixed end of one of the two horizontal hydraulic cylinders is connected with the fixed end of the other one of the two horizontal hydraulic cylinders.

16. An intake-exhaust transport apparatus, comprising a second conveyance and an intake-exhaust system disposed on the second conveyance;

wherein the intake-exhaust system comprises an intake assembly, an exhaust duct, a lifter and a horizontal adjuster; the intake assembly and the exhaust duct are connected with each other, the lifter is configured to jack up the intake assembly and the exhaust duct as a whole, and the horizontal adjuster is configured to drive the intake assembly and the exhaust duct to move along a transverse direction, the horizontal adjuster comprises a retractable support structure for bearing the intake assembly and the exhaust duct, and configured to implement a horizontal movement of the intake assembly and the exhaust duct by its horizontal expansion, and the retractable support structure comprises:

a supporting frame, connected with the intake assembly and the exhaust duct;

an expansion chamber, fixed on the supporting frame;

an expansion support; and a horizontal hydraulic cylinder, comprising a fixed end and a movable end, wherein one end of the expansion support is connected to the lifter, and the other end of the expansion support is partially disposed in the expansion chamber and movable in the expansion chamber along the second direction, and the fixed end of the horizontal hydraulic cylinder is connected with the supporting frame and the movable end of the horizontal hydraulic cylinder is connected with the lifter and is configured to move along the second direction.

* * * * *